(12) United States Patent
Sabapathy

(10) Patent No.: US 11,574,551 B1
(45) Date of Patent: Feb. 7, 2023

(54) SYSTEM AND METHOD OF ASSESSING ENTITY EXPERTISE

(71) Applicant: Alessandra Sabapathy, Brighton, MA (US)

(72) Inventor: Alessandra Sabapathy, Brighton, MA (US)

(73) Assignee: Alessandra Sabapathy, Brighton, MA (US)

( * ) Notice: Subject to any disclaimer, the term of this patent is extended or adjusted under 35 U.S.C. 154(b) by 0 days.

(21) Appl. No.: 17/521,302

(22) Filed: Nov. 8, 2021

(51) Int. Cl.
*G09B 7/02* (2006.01)

(52) U.S. Cl.
CPC ..................... *G09B 7/02* (2013.01)

(58) Field of Classification Search
None
See application file for complete search history.

(56) References Cited

U.S. PATENT DOCUMENTS

| | | | |
|---|---|---|---|
| 5,085,439 A | 2/1992 | Lott | |
| 6,460,852 B1 | 10/2002 | Tallian | |
| 7,621,808 B2 | 11/2009 | Walker | |
| 8,808,003 B2 | 8/2014 | Northcutt | |
| 9,220,973 B1 | 12/2015 | Stringer | |
| 2007/0200293 A1 | 8/2007 | Gomez et al. | |
| 2009/0045572 A1 | 2/2009 | Teal | |
| 2010/0090401 A1 | 4/2010 | Jacklin | |
| 2011/0217687 A1* | 9/2011 | Yeh | G09B 7/00 434/362 |
| 2013/0020762 A1 | 1/2013 | Taylor | |
| 2014/0234808 A1 | 8/2014 | Munn | |
| 2015/0328534 A1 | 11/2015 | Ameen | |

FOREIGN PATENT DOCUMENTS

WO 2006034109 A2 3/2006

OTHER PUBLICATIONS

Game Development Group, Wit's End Board Game—Ages 16 to Adult, Sep. 10, 2021.
North Star Games, North Star Games Wits & Wagers Board Game | Family Edition, Kid Friendly Party Game and Trivia, Sep. 10, 2021.

\* cited by examiner

*Primary Examiner* — James B Hull
(74) *Attorney, Agent, or Firm* — Caldwell Intellectual Property Law

(57) ABSTRACT

In an aspect a system for assessing entity expertise is presented. A system includes at least one entity. A system includes an entity intercommunication device. A system includes an entity conveyance system. An entity conveyance system includes a plurality of assessment devices. Each assessment device of a plurality of assessment devices is configured to receive an entity input and communicate the entity input to an entity intercommunication device. An entity conveyance system is configured to validate an entity input as a function of an exterior a data set and score the entity input as a function of the validation of the entity input.

14 Claims, 7 Drawing Sheets

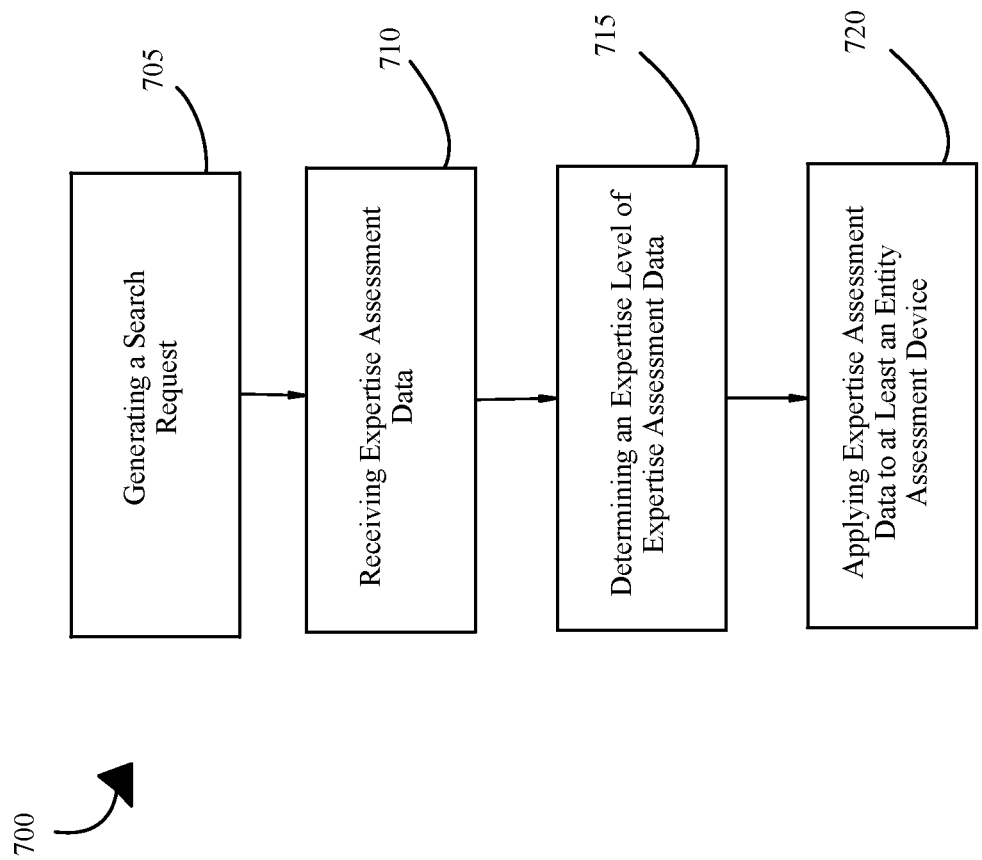

SYSTEM AND METHOD OF ASSESSING ENTITY EXPERTISE

FIELD OF THE INVENTION

The present invention generally relates to the field of entity expertise assessment. In particular, the present invention is directed to systems and methods of assessing entity expertise.

BACKGROUND

Many individuals are knowledgeable on a variety of subject matters. However, assessing an individual's knowledgeability of subject matter may be a tedious and unengaging task. As such, modern systems for entity expertise assessment can be improved.

SUMMARY OF THE DISCLOSURE

In an aspect a system for assessing entity expertise is presented. A system includes at least one entity. A system includes an entity intercommunication device. A system includes an entity conveyance system. An entity conveyance system includes a plurality of assessment devices. Each assessment device of a plurality of assessment devices is configured to receive an entity input and communicate the entity input to an entity intercommunication device. An entity conveyance system is configured to validate an entity input as a function of an exterior a data set and score the entity input as a function of the validation of the entity input.

In another aspect a method of manufacturing an entity expertise assessment device using a computing device is presented. A method includes generating a web crawler function. A method includes receiving, from a web crawler function, expertise assessment data of a plurality of data. A method includes determining an expertise level associated with each datum of expertise assessment data as a function of a logic comparison program. A method includes applying expertise assessment data to at least an entity assessment device as a function of an expertise level associated with each datum of expertise assessment data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 7 is a flowchart of a method of manufacturing an entity expertise assessment device.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Described herein is a system for assessing entity expertise. A system may include at least one entity. A system may include an entity intercommunication device. A system may include an entity conveyance system. An entity conveyance system may include a plurality of assessment devices. Each assessment device of a plurality of assessment devices may be configured to receive an entity input and communicate the entity input to an entity intercommunication device. An entity conveyance system may be configured to validate an entity input as a function of an exterior a data set and score the entity input as a function of the validation of the entity input.

Described herein is a method of manufacturing an entity expertise assessment device using a computing device. A method may include generating a web crawler function. A method may include receiving, from a web crawler function, expertise assessment data of a plurality of data. A method may include determining an expertise level associated with each datum of expertise assessment data as a function of a logic comparison program. A method may include applying expertise assessment data to at least an entity assessment device as a function of an expertise level associated with each datum of expertise assessment data.

Figure 1:
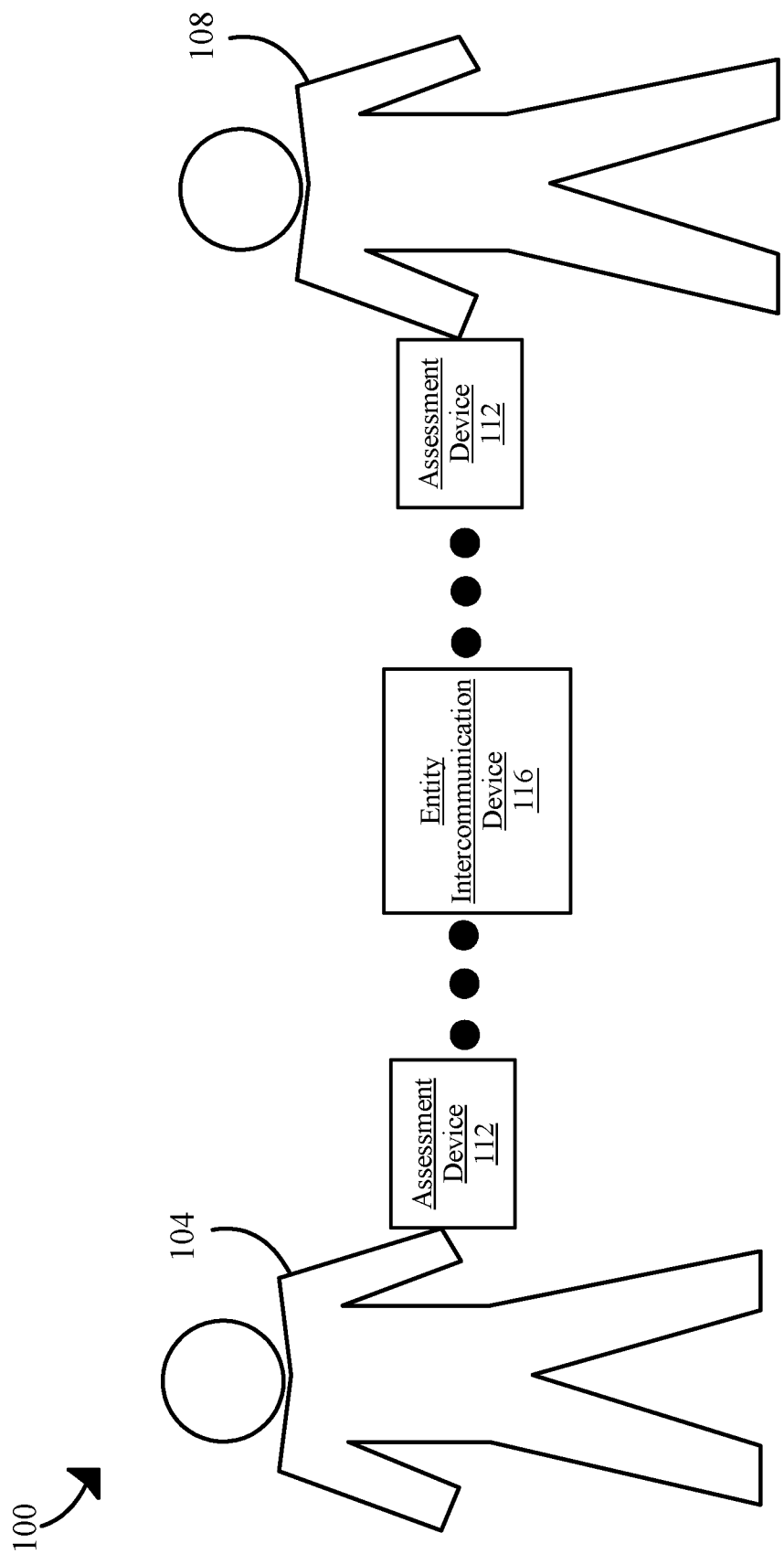
FIG. 1 is an exemplary embodiment of system for assessing entity expertise.

Referring now to the drawings, FIG. 1 illustrates an exemplary embodiment of a system 100 for assessing entity expertise. System 100 may include first entity 104. An "entity" as used in this disclosure is an individual and/or group thereof. First entity 104 may include, but is not limited to, a person, a group of people, an artificial intelligence device implementing a machine-learning model, and the like. In some embodiments, system 100 may include second entity 108. Second entity 108 may include, but is not limited to, a person, group of people, an artificial intelligence, and the like. In some embodiments, system 100 may include greater than two entities. In some embodiments, system 100 may include three or more entities. In some embodiments, first entity 104 and/or second entity 108 may include an expertise. An "expertise" as used in this disclosure is a level of knowledge of a subject matter. In some embodiments, an expertise may include levels such as, but not limited to, amateur, moderate, knowledgeable, superior, and the like. "Amateur" as used in this disclosure is a level of expertise corresponding to of the lowest level of expertise of an entity. "Moderate" as used in this disclosure is a level of expertise corresponding to an average skill of an entity. "Knowledgeable" as used in this disclosure is a level of expertise corresponding to an above average skill of an entity. "Superior" as used in this disclosure is a level of expertise corresponding to an elite or highest skill of an entity. In some embodiments, expertise may be measured in subject matters such as, but not limited to, scientific fields, historical fields, mathematical fields, artistic fields, and the like. In some embodiments, expertise may be measured in subject matter such as, but not limited to, video games, movies, sports, celebrities, musicians, comedians, tv stars, tv shows, and the like. In some embodiments, first entity 104 may share a level of knowledge of a subject matter with second entity 108. In other embodiments, first entity 104 may have knowledge of a subject matter different than that of second entity 108. In some embodiments, first entity 104 and second entity 108 may have a similar expertise level in a same subject matter. In a non-limiting example, first entity 104 and second entity 108 may include a relatively similar expertise in knowledge of cooking styles. In another non-limiting example, first entity 104 and second entity 108 may share a similar expertise in knowledge of a boy band.

Still referring to FIG. 1, system 100 may include entity intercommunication device 116. An "entity intercommunication device" as used in this disclosure is any object or group of objects configured to transfer information between two or more individuals. In some embodiments, entity intercommunication device 116 may include, but is not limited to, a computing device, mobile application, web browser, telephonic system, and the like. A computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single computing device operating independently, or may include two or more computing device operating in concert, in parallel, sequentially or the like; two or more computing devices may be included together in a single computing device or in two or more computing devices. A computing device may interface or communicate with one or more additional devices as described below in further detail via a network interface device. Network interface device may be utilized for connecting a computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. [Computing device]may include but is not limited to, for example, a computing device or cluster of computing devices in a first location and a second computing device or cluster of computing devices in a second location. A computing device may include one or more computing devices dedicated to data storage, security, distribution of traffic for load balancing, and the like. A computing device may distribute one or more computing tasks as described below across a plurality of computing devices of computing device, which may operate in parallel, in series, redundantly, or in any other manner used for distribution of tasks or memory between computing devices. A computing device may be implemented using a "shared nothing" architecture in which data is cached at the worker, in an embodiment, this may enable scalability of system 100 and/or a computing device.

With continued reference to FIG. 1, a computing device may be designed and/or configured to perform any method, method step, or sequence of method steps in any embodiment described in this disclosure, in any order and with any degree of repetition. For instance, a computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, in some embodiments, entity intercommunication device 116 may include a set of cards, a board game, a book, and the like. In some embodiments, entity intercommunication device 116 may include a shape. A shape may include, but is not limited to, a rectangle, square, triangle, serpentine, oval, circular, hexagonal, and/or other shapes. In some embodiments, entity intercommunication device 116 may be configured to fold vertically, horizontally, and the like. Entity intercommunication device 116 may be configured to fold into a smaller, travel sized version. In some embodiments, entity intercommunication device 116 may include one or more modular sections. A "modular section" as used in this disclosure is any defined space that if entered changes one or more systems. A modular section may include a shape. A shape may include, but is not limited to, a square, rectangle, circle, triangle, hexagon, trapezoid, rhombus, and the like. In some embodiments, a modular section may include a color code. A "color code" as used in this disclosure is a system that correlates a color to a category and/or a function. In some embodiments, a color code may include primary colors such as, but not limited to red, yellow, and/or blue. In some embodiments, a color code may include any combination of red, yellow, and/or blue. In some embodiments, a color code may include two or more colors corresponding to a single category and/or function. In some embodiments, a color code may include two or more colors corresponding to two or more categories and/or functions. In some embodiments, a color code may be configured to correspond a color to an expertise assessment function. In a non-limiting example, a color code may include a red square that may correspond to a trivial question function. In some embodiments, entity intercommunication device 116 may include a plurality of modular sections. In some embodiments, a plurality of modular sections may be organized in a grid-like pattern. In some embodiments, a plurality of modular sections may be aligned with a border of entity intercommunication device 116.

Still referring to FIG. 1, system 100 may include assessment device 112. An "assessment device" as used in this disclosure is an object and/or group of objects that is configured to measure a metric of an individual. In some embodiments, assessment device 112 may include, but is not limited to, a smartphone, tablet, mobile application, web browser, survey, photographic imagery, audio samples, and the like. Photographic imagery may include images pertaining to a specific subject matter. As a non-limiting example, photographic imagery may include photos of a reality tv show. In some embodiments, photographic imagery may include, but is not limited to, printed photos, electronic photos, and the like. Assessment device 112 may include an audio sample. An audio sample may include, but is not limited to, lyrics, recordings, sounds, and the like. As a non-limiting example, audio samples may include songs of a specific musical group. In some embodiments, assessment device 112 may include a question card. A question card may include a pre-determined question about a specific area of knowledge. As a non-limiting example, assessment device 112 may include a trivia card relating to a musical group. In some embodiments, system 100 may include a plurality of assessment devices. A plurality of assessment devices may include a variety of different assessment devices, such as, but not limited to, a trivia card, a pictograph, and the like. In some embodiments, a plurality of assessment devices may include all or some identical assessment devices. As a non-limiting example, two entities may interact with two trivia cards and a third entity may interact with a pictograph. As another non-limiting example, three entities may all interact with trivia cards.

Figure 2:
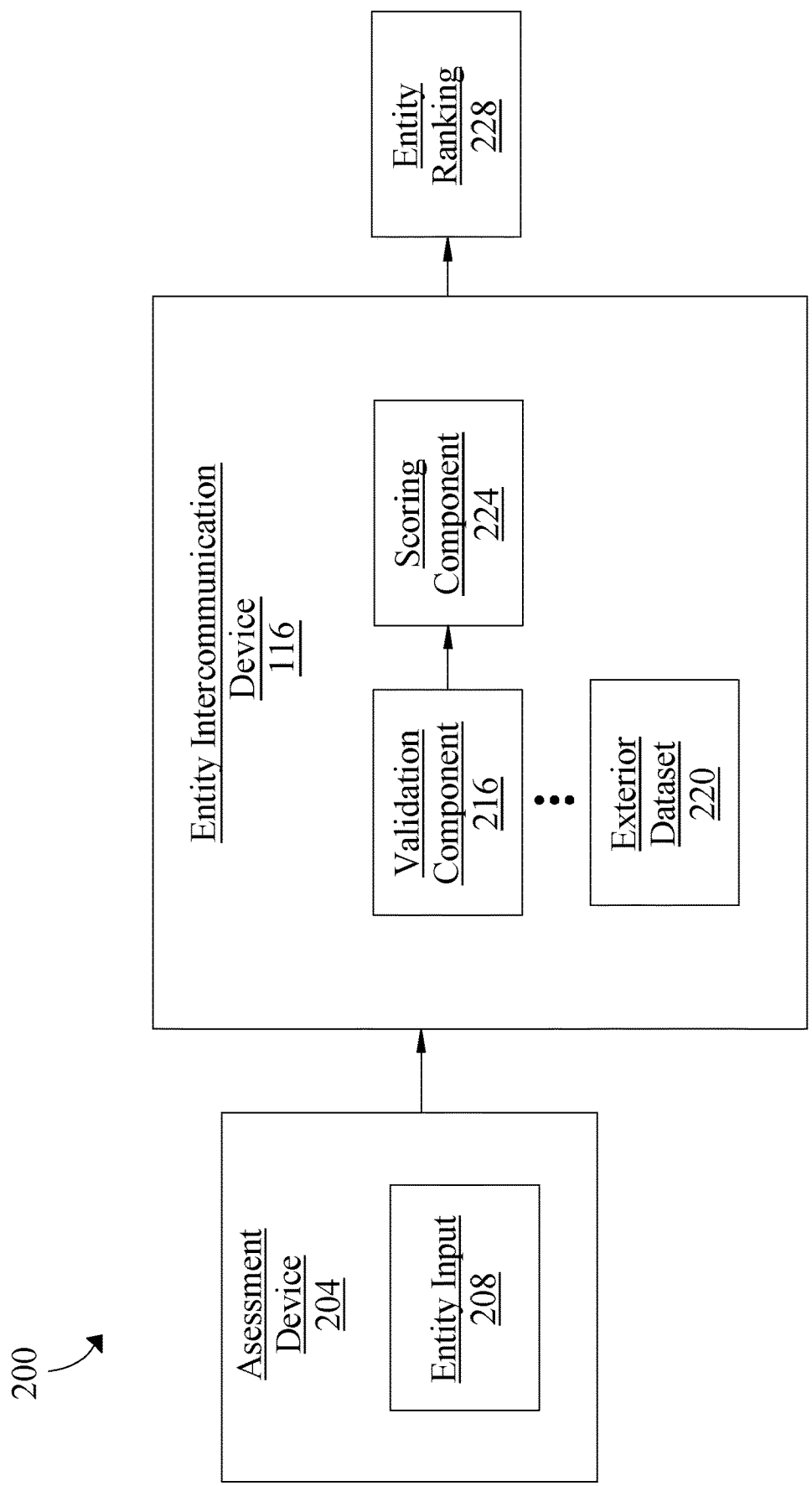
FIG. 2 is a block diagram of an entity conveyance system.

Referring now to FIG. 2, entity conveyance system 200 is presented. An "entity conveyance system" as used in this disclosure is a device and/or group of devices capable of sharing data input between two or more individuals. Entity conveyance system 200 may include an entity orientation element. An "entity orientation element" as used in this disclosure is any element dictating a position of an entity. An entity orientation element may include, but is not limited to, a marking, arrow, word, phrase, and the like. In some embodiments, an entity orientation element may dictate a placement of an entity on entity intercommunication device 116. In other embodiments, an entity orientation element may dictate a position of an entity relative to one or more other entities. Entity conveyance system 200 may include entity intercommunication device 116. Entity intercommunication device 116 may be as described above in FIG. 1. In some embodiments, entity intercommunication device 116 may be configured to receive entity input 208 from assessment device 204. "Entity input" as used in this disclosure is a datum and/or data received from an individual. In some embodiments, entity input may include auditory input. Auditory input may include, but is not limited to, a vocalization and/or other sound generated from an entity. In some embodiments, auditory input may include phrases and/or words. In some embodiments, auditory input may include singing. Assessment device 204 may prompt an entity with a question which may require an auditory response from the entity. In some embodiments, entity input 208 may include a physical input. A physical input may include, but is not limited to, a motion, dance, hand signal, gesture, and the like. In some embodiments, assessment device 204 may prompt an entity with a question that may require a physical input from the entity. Entity intercommunication device 116 may be configured to receive one or more entity inputs 208.

Still referring to FIG. 2, in some embodiments, entity intercommunication device 116 may include validation component 216. A "validation component" as used in this disclosure is any device that is configured to verify an input. In some embodiments, validation component 216 may include, but is not limited to, a list, a card, an audio sample, a photograph, and the like. Validation component 216 may include an expertise assessment table. An "expertise assessment table" as used in this disclosure is a data structure with a data set correlating entity inputs to correct answers. In some embodiments, an expertise assessment table may be generated from exterior dataset 220. In some embodiments, validation component 216 may be in communication with exterior dataset 220. Exterior dataset 220 may include data pertaining to a specific area of knowledge. In some embodiments, exterior dataset 220 may include categories such as, but not limited to, movies, sports, tv shows, celebrities, science, history, math, art, English, video games, and the like.

Continuing to refer to FIG. 2, exterior dataset 220 may be generated by a computing device. In some embodiments, exterior dataset 220 may be generated by an index classifier. In an embodiment, an index classifier may include a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. An index classifier may include a classifier configured to input expertise assessment inquires and output web search indices. A "web search index," as defined in this disclosure is a data structure that stores uniform resource locators (URLs) of web pages together with one or more associated data that may be used to retrieve URLs by querying the web search index; associated data may include keywords identified in pages associated with URLs by programs such as web crawlers and/or "spiders." A web search index may include any data structure for ordered storage and retrieval of data, which may be implemented as a hardware or software module. A web search index may be implemented, without limitation, as a relational database, a key-value retrieval datastore such as a NOSQL database, or any other format or structure for use as a datastore that a person skilled in the art would recognize as suitable upon review of the entirety of this disclosure. Data entries in a web search index may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a web search index may reflect categories, cohorts, and/or populations of data consistently with this disclosure. In an embodiment, a web search query at a search engine may be submitted as a query to a web search index, which may retrieve a list of URLs responsive to the query. In some embodiments, a computing device may be configured to generate a web search query based on a freshness and/or age of a query result. A freshness may include an accuracy of a query result. An age may include a metric of how outdated a query result may be. In some embodiments, a computing device may generate a web crawler configured to search the Internet for data of areas of knowledge, such as, but not limited to, movies, sports, science, history, English, TV shows, and the like. As a non-limiting example, a computing device may generate a web crawler configured to search and/or index information on a boy band. Exterior dataset 220 may be generated as a function of data retrieved by one or more web crawlers.

Still referring to FIG. 2, a computing device and/or another device may generate an index classifier using a classification algorithm, defined as a process whereby a computing device derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Training data may include data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 2, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by a computing device may correlate any input data as described in this disclosure to any output data as described in this disclosure. In some embodiments, training data may include index training data. Index training data, defined as training data used to generate an index classifier, may include, without limitation, a plurality of data entries, each data entry including one or more elements of entity expertise data such as data of areas of knowledge, and one or more correlated entity assessment functions, where entity assessment functions and associated entity expertise data may be identified using feature learning algorithms as described below. Index training data and/or elements thereof may be added to, as a non-limiting example, by classification of multiple users' entity expertise data to entity assessment functions using one or more classification algorithms.

Still referring to FIG. 2, a computing device may be configured to generate an index classifier using a Naïve Bayes classification algorithm. A Naïve Bayes classification algorithm generates classifiers by assigning class labels to problem instances, represented as vectors of element values. Class labels may be drawn from a finite set. A Naïve Bayes classification algorithm may include generating a family of algorithms that assume that the value of a particular element is independent of the value of any other element, given a class variable. A Naïve Bayes classification algorithm may be based on Bayes Theorem expressed as $P(A/B)=P(B/A) P(A)+P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A Naïve Bayes algorithm may be generated by first transforming training data into a frequency table. A computing device may then calculate a likelihood table by calculating probabilities of different data entries and classification labels. A computing device may utilize a Naïve Bayes equation to calculate a posterior probability for each class. A class containing the highest posterior probability may be the outcome of prediction. A Naïve Bayes classification algorithm may include a gaussian model that follows a normal distribution. A Naïve Bayes classification algorithm may include a multinomial model that is used for discrete counts. A Naïve Bayes classification algorithm may include a Bernoulli model that may be utilized when vectors are binary.

With continued reference to FIG. 2, a computing device may be configured to generate an index classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 2, generating a k-nearest neighbors algorithm may include generating a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. As a non-limiting example, K-nearest neighbors algorithm may be configured to classify an input vector including a plurality of user-entered words and/or phrases, a plurality of attributes of a media item, such as spoken or written text, objects depicted in images, metadata, or the like, to clusters representing themes.

In an embodiment, and still referring to FIG. 2, a computing device, and/or a device generating an index classifier, may generate new entity assessment functions using a feature learning algorithm. A "feature learning algorithm," as used herein, is a machine-learning algorithm that identifies associations between elements of data in a training data set, where particular outputs and/or inputs are not specified. For instance, and without limitation, a feature learning algorithm may detect co-occurrences of sets of entity expertise data, as defined above, with each other. As a non-limiting example, a feature learning algorithm may detect co-occurrences of entity expertise data, as defined above, with each other. A computing device may perform a feature learning algorithm by dividing entity expertise data from a given source into various sub-combinations of such data to create entity expertise data sets as described above, and evaluate which entity expertise data sets tend to co-occur with which other entity expertise data sets. In an embodiment, a first feature learning algorithm may perform clustering of data.

Continuing to refer to FIG. 2, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance behavioral training set as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of entity expertise data with multiple entity skill levels, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 2, a computing device may generate a k-means clustering algorithm receiving unclassified entity expertise data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related entity expertise data, which may be provided with entity assessment functions; this may, for instance, generate an initial set of entity assessment functions from an initial set of entity expertise data of a large number of users, and may also, upon subsequent iterations, identify new clusters to be provided new entity assessment functions, to which additional entity expertise data may be classified, or to which previously used entity expertise data may be reclassified.

With continued reference to FIG. 2, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids $c_i$ of centroids in set C. Unclassified data may be assigned to a cluster based on $\mathrm{argmin}_{c_i \in C} \mathrm{dist}(c_i, x)^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $ci=1/|Si|\Sigma\ xi \in Si^{xi}$ K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 2, k-means clustering algorithm may be configured to calculate a degree of similarity index value. A "degree of similarity index value" as used in this disclosure, includes a distance measurement indicating a measurement between each data entry cluster generated by k-means clustering algorithm and a selected entity expertise data set. Degree of similarity index value may indicate how close a particular combination of entity expertise data, entity assessment functions and/or entity expertise skill level is to being classified by k-means algorithm to a particular cluster. K-means clustering algorithm may evaluate the distances of the combination of entity expertise skill levels to the k-number of clusters output by k-means clustering algorithm. Short distances between a set of entity expertise data and a cluster may indicate a higher degree of similarity between the set of entity expertise data and a particular cluster. Longer distances between a set of entity expertise data and a cluster may indicate a lower degree of similarity between an entity expertise data set and a particular cluster.

With continued reference to FIG. 2, k-means clustering algorithm selects a classified data entry cluster as a function of the degree of similarity index value. In an embodiment, k-means clustering algorithm may select a classified data entry cluster with the smallest degree of similarity index value indicating a high degree of similarity between an entity expertise data set and the data entry cluster. Alternatively or additionally k-means clustering algorithm may select a plurality of clusters having low degree of similarity index values to entity expertise data sets, indicative of greater degrees of similarity. Degree of similarity index values may be compared to a threshold number indicating a minimal degree of relatedness suitable for inclusion of a set of entity expertise data in a cluster, where a degree of similarity indices falling under the threshold number may be included as indicative of high degrees of relatedness. Persons skilled in the art, upon reviewing the entirety of this disclosure, will be aware of various additional or alternative feature learning approaches that may be used consistently with this disclosure.

Still referring to FIG. 2, a computing device may be configured to generate an entity expertise index classifier using thematic training data including a plurality of media items and a plurality of correlated themes. As used herein, a "media item" is an element of content transmitted over a network such as the Internet to be displayed on a user device, which may include any computing device as described in this disclosure. A media item may include, without limitation, an image, a video, an audio file, and/or a textual file. A media item may include an item of a persuasive nature, such as, without limitation, an advertisement. A media item may include a banner advertisement, a "popup" advertisement, a "pop under" advertisement, an advertisement that displays in a layer such as a layer in front of a web page, a redirect advertisement, a "splash screen" advertisement, or the like. A media item may include a "meme," a video forwarded between and/or from social media users, and/or platforms, or the like. A media item may include metadata such as owner, producer, time or place of creation, or the like A media item may include a title. A "theme" of a media item is a subject matter that the media item is promoting, describing, or otherwise providing via its content. A "principal theme" as used in this disclosure is a "main point" or primary purpose of a media item. For instance, in an advertisement, a principal theme of the advertisement may be a product, service, and/or brand being promoted or sold thereby. A principal theme of a video, story, or meme may include a main character, subject matter, place, event, or other main focus of the video, story, or meme.

Still referring to FIG. 2, media training data may be populated by receiving a plurality of user inputs, for instance via graphical user interface forms; as a non-limiting example, each such form may present to a user at least a media item and a user may select a label for each such media item from a list of labels provided to the user and/or may enter one or more words in a text entry element, which may be mapped to labels using language processing as described below; label selected by user may correspond to a user-entered identification of a principal theme of the media item. An entity expertise index classifier may input media items and output principal themes of the media items.

Continuing to refer to FIG. 2, a computing device may be configured to generate an entity expertise index classifier using a classification algorithm, which may be implemented, without limitation, using any classification algorithm suitable for generating a vice classifier as described above. As a non-limiting example, an entity expertise index classifier may use a K-nearest neighbors algorithm that may be configured to classify an input vector including a plurality of attributes of a media item, such as spoken or written text, objects depicted in images, metadata, etc., to clusters representing themes. An entity expertise index classifier may alternatively or additionally be created using a naïve-Bayes classification algorithm as described above. An entity expertise index classifier may enable a computing device to identify a single theme represented by the best-matching cluster and/or some number of best-matching clusters, such as the K best matching clusters; in the latter case, matching a theme as described below may include matching any of the K best themes, or the most probable theme may be treated as the main theme and the remaining matching clusters may be treated as identifying themes of secondary importance.

In an embodiment, and continuing to refer to FIG. 2, a computing device may modify media training data, for instance to replace a media item with plurality of objects; plurality of objects may be used as attributes of a vector associated with a media item in media training data, for instance for use in KNN or other classification algorithms as described above. Objects of plurality of objects may include, without limitation, objects depicted in images or frames of media, objects described in textual data extracted from images or text, and/or converted from spoken words in media, or the like. In an embodiment, a computing device may be configured to extract, from each media item, a plurality of content elements, such as without limitation geometric forms extracted from images and/or video frames, words or phrases of textual data, or the like. A computing device may be configured to classify each content element of the plurality of content elements to an object of a plurality of objects using an object classifier, where the object classifier may be generated using any classification algorithm as described above. An object classifier may classify words, phrases, and/or geometrical forms to clusters corresponding to labels of objects, enabling a vector representing presence or relative frequency of objects to be created, for instance by populating a vector index corresponding to each of a list of objects with a number indicating presence or absence of an object corresponding to an index and/or a number indicating a number of occurrences of an object corresponding to an index. In the latter case, as a non-limiting example, a higher number may indicate a greater prevalence of a given object in the media item, which may, as a non-limiting example, cause an entity expertise index classifier to classify the media item to a theme consistent with a higher prevalence of a given object; prevalence and/or relative frequency of an object in media item may also be used, as described below, to determine a degree to which the object is presented in the media item for additional processing. In an embodiment, a computing device may replace media item with a plurality of objects as described above in media training data; for instance, a separate instance of media training data in which media items are replaced with plurality of objects may be generated, permitting use thereof in place of the original media training data. Where object classifier is updated, for instance by adding to a list of objects corresponding to clusters and rerunning object classifier to classify to the updated list, media items stored in memory may be subjected to object classifier again to update each plurality of objects; each of these actions, including without limitation rerunning object classifier to classify to the updated list and/or updating plurality of objects, may be performed by a computing device. An entity expertise index classifier may likewise be updated by rerunning classification algorithms on updated media training data.

Still referring to FIG. 2, an object classifier and/or classifiers may be run against one or more sets of object training data, where object training data may include any form of object training data as described above. Object training data may include, without limitation, a plurality of data entries, each data entry including one or more content elements and one or more objects represented thereby. Object training data and/or elements thereof may be entered by users, for instance via graphical user interface forms; as a non-limiting example, each such form may present to a user a geometric form, word, image, or the like, and a user may select a label for each such geometric form, word, image, or the like from a list of labels provided to the user and/or may enter one or more words in a text entry element, which may be mapped to labels using language processing as described below.

With continued reference to FIG. 2, a computing device may be configured to classify geometric forms identified in images and/or video frames to objects using a visual object classifier; that is, an object classifier may include a visual object classifier. A visual object classifier may include any classifier described above; a visual object classifier may generate an output classifying a geometric form in a photograph to an object according to any classification algorithm as described above. In an embodiment, a computing device may train a visual object classifier using an image classification training set, which may, as a non-limiting example, include geometric forms extracted from photographs and identifications of one or more objects associated therewith. Image classification training set may, for instance, be populated by user entries of photographs, other images of objects, and/or geometric representations along with corresponding user entries identifying and/labeling objects as described above. A computing device may identify objects in the form of geometrical figures in the photographs as described above, and create training data entries in a visual object classifier training set with the photographs and correlated objects; in an embodiment, correlations may be further identified by matching locations of objects in a coordinate system mapped onto images to locations of geometric objects in a photograph, by receiving user identifications or "tags" of particular objects, or the like. A computing device may be configured to extract the plurality of content elements by extracting a plurality of geometric forms from a visual component of the media item and classify the plurality of geometric forms using the visual object classifier.

Still referring to FIG. 2, a computing device may be configured to classify textual elements to objects using a linguistic object classifier; that is, an object classifier may include a linguistic object classifier. Textual elements may include words or phrases, as described in further detail below, extracted from textual data such as documents or the like. Textual elements may include other forms of data converted into textual data, such as without limitation textual data converted from audio data using speech-to-text algorithms and/or protocols, textual data extracted from images using optical character recognition (OCR), or the like. A linguistic object classifier may include any classifier described above; a linguistic object classifier may generate an output classifying an element of textual data to an object according to any classification algorithm as described above. In an embodiment, a computing device may train a linguistic object classifier using a linguistic classification training set, which may, as a non-limiting example, include elements of textual data and identifications of one or more objects associated therewith. Linguistic classification training set may, for instance, be populated by user entries of textual data along with corresponding user entries identifying and/or labeling objects as described above. A computing device may be configured to extract the plurality of content elements by extracting a plurality of textual elements from a verbal component of the media item and classify the plurality of textual elements using a linguistic object classifier.

Still referring to FIG. 2, generation of linguistic classification training set, mapping of user entries to object labels, and/or classification of textual objects to labels may alternatively or additionally be performed using a language processing algorithm. A language processing algorithm may operate to produce a language processing model. A language processing model may include a program automatically generated by language processing algorithm to produce associations between one or more words and/or phrases, including without limitation mathematical associations, between such words. Associations between language elements, where language elements include for purposes herein extracted words and/or object labels, without limitation, mathematical associations, including without limitation statistical correlations between any language element and any other language element and/or language elements. Statistical correlations and/or mathematical associations may include probabilistic formulas or relationships indicating, for instance, a likelihood that a given word and/or phrase indicates a given object label and/or a given additional word and/or phrase. As a further example, statistical correlations and/or mathematical associations may include probabilistic formulas or relationships indicating a positive and/or negative association between at least a word and/or phrase and an object label and/or an additional word.

Still referring to FIG. 2, a language processing algorithm may generate a language processing model by any suitable method, including without limitation a natural language processing classification algorithm; language processing model may include a natural language process classification model that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM) HMMs as used herein are statistical models with inference algorithms that that may be applied to the models in such models, a hidden state to be estimated may include an association between at least a word and/or phrase and an object label and/or an additional word. There may be a finite number of labels, words and/or phrases, and/or relationships therebetween; an HMM inference algorithm, such as the forward-backward algorithm or the Viterbi algorithm, may be used to estimate the most likely discrete state given a word or sequence of words. Language processing algorithm may combine two or more approaches. For instance, and without limitation, machine-learning program may use a combination of Naive-Bayes, Stochastic Gradient Descent (SGD), and parameter grid-searching classification techniques; the result may include a classification algorithm that returns ranked associations.

Continuing to refer to FIG. 2, generating a language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 2, a language processing algorithm may use a corpus of documents to generate associations between language elements in a language processing algorithm, and a computing device may then use such associations to analyze words extracted from one or more documents and determine that the one or more documents indicate a given relationship between at least a word and/or phrase and an object label and/or an additional word. In an embodiment, a computing device may perform an analysis using a selected set of significant documents, such as documents identified by one or more users and/or expert users, and/or a generalized body of documents and/or co-occurrence data, which may be compiled by one or more third parties. Documents and/or co-occurrence data may be received by a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, a computing device may automatically obtain the documents, co-occurrence data, or the like by downloading and/or navigating to one or more centralized and/or distributed collections thereof. A computing device may alternatively or additionally receive any language processing model from one or more remote devices or third-party devices and utilize such language processing model as described above.

Still referring to FIG. 2, a computing device may detect and/or intercept media using one or more programs and/or modules that can act to detect and/or redirect content that is being transmitted to a user device; such programs and/or modules may include, without limitation, web browsers provided to a user device, "plugins" or the like operating on web browsers on a user device, programs and/or modules installed at advertisement providers, content providers, social media platforms or the like, and/or programs that route network traffic through one or more servers operated by a computing device as a portal for network access for human subject's device. Persons skilled in the art, upon reviewing the entirety of this disclosure, will be aware of various additional or alternative ways in which a computing device may receive and/or detect media items within the scope of this disclosure.

With continued reference to FIG. 2, a computing device may be configured to identify a principal theme of a received media item using a media theme classifier. A computing device may input a media item to a media theme classifier, which may output a principal theme, for instance by identifying a cluster, corresponding to a theme, which is most closely associated with a media item, as described above. In an embodiment, a computing device may input a plurality of objects identified in the media item to a media theme classifier. For instance, and without limitation, a computing device may extract a plurality of content elements from a media item, where extraction may be performed in any manner described above. A computing device may classify each content element of plurality of content elements to an object of a plurality of objects using an object classifier, which may be any object classifier or collection of object classifiers as described above. A computing device may input plurality of objects to a media theme classifier.

Still referring to FIG. 2, exterior dataset 220 may be generated by any indexing algorithms and/or models as described above. Exterior dataset 220 may include indexed entity expertise data that may map one or more entity expertise data elements to other entity expertise data elements. As a non-limiting example, an indexing algorithm may sort exterior dataset 220 by media sources such as, but not limited to, tv shows, movies, podcasts, music videos, social media posts, textual data, and the like. In some embodiments, an indexing algorithm may group and/or map data of exterior dataset 220 by category such as, but not limited to, boy bands, horror movies, sports trivia, history data, science field data, and the like. In some embodiments, an indexing algorithm may link and/or map data of exterior dataset 220 based on a skill level. As a non-limiting example, two data entries reciting names of members of a boy band may be linked under an "amateur" knowledge category. In some embodiments, an indexing algorithm may map and/or link data of exterior dataset 220 based on temporal categories. As a non-limiting example, an indexing algorithm may map and/or link two or more data entries under an "old" category, where the two or more data entries may include data of an expertise knowledge area from over a decade ago.

Still referring to FIG. 2, exterior dataset 220 may be generated by a computing device using a fuzzy logic comparison. A fuzzy logic comparison may include a first fuzzy set. A first fuzzy set may be represented, without limitation, according to a first membership function representing a probability that an input falling on a first range of values is a member of the first fuzzy set, where the first membership function has values on a range of probabilities such as without limitation the interval [0,1], and an area beneath the first membership function may represent a set of values within first fuzzy set. Although a first range of values is illustrated for clarity in this exemplary depiction as a range on a single number line or axis, a first range of values may be defined on two or more dimensions, representing, for instance, a Cartesian product between a plurality of ranges, curves, axes, spaces, dimensions, or the like. A first membership function may include any suitable function mapping a first range to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 2, a first fuzzy set may represent any value or combination of values as described above, including entity expertise skill level, probabilistic outcome, any resource datum, any niche datum, and/or any combination of the above. A second fuzzy set, which may represent any value which may be represented by first fuzzy set, may be defined by a second membership function on a second range; a second range may be identical and/or overlap with a first range and/or may be combined with first range via Cartesian product or the like to generate a mapping permitting evaluation overlap of a first fuzzy set and a second fuzzy set. Where first fuzzy set and second fuzzy set have a region that overlaps, a first membership function and a second membership function may intersect at a point representing a probability, as defined on probability interval, of a match between a first fuzzy set and a second fuzzy set. Alternatively or additionally, a single value of a first and/or a second fuzzy set may be located at a locus on a first range and/or a second range, where a probability of membership may be taken by evaluation of a first membership function and/or a second membership function at that range point. A probability may be compared to a threshold to determine whether a positive match is indicated. A threshold may, in a non-limiting example, represent a degree of match between a first fuzzy set and a second fuzzy set, and/or single values therein with each other or with either set, which is sufficient for purposes of the matching process; for instance, threshold may indicate a sufficient degree of overlap between probabilistic outcomes and/or predictive prevalence values for combination to occur as described above. There may be multiple thresholds; for instance, a second threshold may indicate a sufficient match for purposes of a pooling threshold as described in this disclosure. Each threshold may be established by one or more user inputs. Alternatively or additionally, each threshold may be tuned by a machine-learning and/or statistical process, for instance and without limitation as described in further detail below.

Still referring to FIG. 2, in an embodiment, a degree of match between fuzzy sets may be used to rank one entity expertise datum against another. For instance, if two entity expertise datums have fuzzy sets matching a probabilistic outcome fuzzy set by having a degree of overlap exceeding a threshold, a computing device may further rank the two entity expertise datums by ranking an entity expertise datum having a higher degree of match more highly than an entity expertise datum having a lower degree of match. Where multiple fuzzy matches are performed, degrees of match for each respective fuzzy set may be computed and aggregated through, for instance, addition, averaging, or the like, to determine an overall degree of match, which may be used to rank entity expertise data; selection between two or more matching entity expertise datums may be performed by selection of a highest-ranking entity expertise datum, and/or multiple predictive prevalence values may be presented to a user in order of ranking. A computing device may use fuzzy logic to classify and/or group two or more data entries of exterior dataset 220. As a non-limiting example, a computing device may determine that an entity expertise assessment function of exterior dataset 220 may be categorized as "difficult" based on an average correct user input of 50%.

Still referring to FIG. 2, validation component 216 may be configured to verify entity input 208. Verification may include comparing entity input 208 with a correct input. A "correct input" as used in this disclosure is a datum or data received from an entity corresponding to a predetermined acceptable aspect of an area of knowledge. A correct input may include, but is not limited to, a word and/or phrase, a gesture, a vocalization, and the like. In some embodiments, validation component 216 may include a list of correct inputs. As a non-limiting example, an entity may provide an entity input to validation component 216, such as the phrase "It was in episode four!". Validation component 216 may cross-reference the phrase with a correct phrase in exterior dataset 220, such as "It was in episode three!". Validation component 216 may determine that the entity input is unverifiable with exterior dataset 220.

Still referring to FIG. 2, entity intercommunication device 116 may include scoring component 224. A "scoring component" as used in this disclosure is a mechanism configured to provide a numerical value to an input. In some embodiments, scoring component 224 may include, but is not limited to, a list of scores associated with correct inputs, a computing device, and the like. In some embodiments, scoring component 224 may be configured to score entity input 208 in a binary fashion. As a non-limiting example, scoring component 224 may score entity input 208 as true or false. In some embodiments, scoring component 224 may be configured to score entity input 208 with a degree of correctness such as, but not limited to partially correct, fully correct, partially wrong, fully wrong, and the like. Scoring component 224 may pair a score with entity input 208. A score may include a numerical value. In some embodiments, scoring component 224 may be configured to pair a score with entity input 208 as a function of validation component 216. As a non-limiting example, scoring component 224 may pair a score of "5" with an entity input 208 for being half right, while a fully correct entity input 208 may receive a score of "10". In some embodiments, scoring component 224 may pair a negative numerical value with entity input 208. As a non-limiting example, a wrong entity input 208 may be paired with a score of "−5" for a half incorrect input, "−10" for a fully incorrect input, and the like. In some embodiments, scoring component 224 may pair a neutral score with entity input 208, such as "0".

Still referring to FIG. 2, entity intercommunication device 116 may be configured to generate entity ranking 228. An "entity ranking" as used in this disclosure is any listing of one entity relative to another entity. In some embodiments, entity ranking 228 may include a listing such as first place, second place, third place, and the like. In some embodiments, entity ranking 228 may compare two or more entities as a function of entity input 208. Entity ranking 228 may determine a higher numerical value of a score between two or more entities. In some embodiments, an entity ranking 228 may determine a lowest numerical value of a score between two or more entities. In some embodiments, entity ranking 228 may determine a matching numerical value of a score of two or more entities. In a non-limiting example, entity ranking 228 may apply a rank of "winner" to an entity and a rank of "loser" to a second entity. In some embodiments, entity ranking 228 may pair a same ranking to two or more entities. As a non-limiting example, two or more entities may receive a ranking of "tie", "second place", "third place" and the like.

Figure 3:
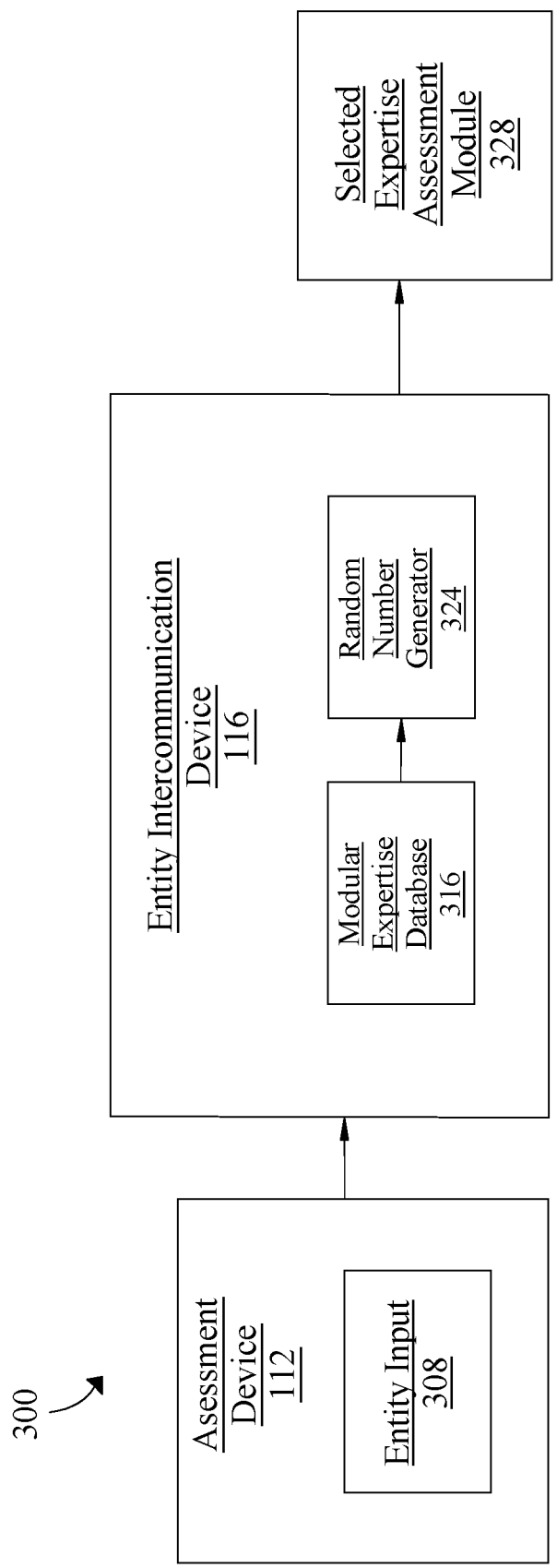
FIG. 3 is a block diagram of an expertise assessment module selection system.

Now referring to FIG. 3, a modular assessment expertise system 300 is presented. System 300 may include assessment device 112. Assessment device 112 may be as described above. In some embodiments, system 300 may include entity intercommunication device 116. Entity intercommunication device 116 may be as described above. Entity intercommunication device 116 may be configured to receive entity input 308. Entity input 308 may be as described above. In some embodiments, entity input 308 may include a selection of a modular expertise module. A "modular expertise module" as used in this disclosure is any subsystem of assessing an expertise of an individual. Entity intercommunication device 116 may include modular expertise database 316. Modular expertise database 316 may include data of one or more sub-assessment systems and/or devices. A sub-assessment system of modular expertise database 316 may include an entity contention function. An "entity contention function" as used in this disclosure is a system that challenges one entity against another entity. In some embodiments, an entity contention function of a sub-assessment system of modular expertise database 316 may include, but is not limited to, a hand gesture contention, a photographic identification contention, a random knowledge contention, a recollection contention, and the like. In some embodiments, an entity contention function may be configured to challenge at least two entities against one another.

Still referring to FIG. 3, a hand gesture contention may include a contention between two entities. A hand gesture contention may be configured to have one entity select another entity as a contender. In some embodiments, a hand gesture contention may include two entities performing a first gesture. A first gesture may include, but is not limited to, making a fist. In some embodiments, a hand gesture contention may include verbal input from two entities.

Verbal input may include, but is not limited to, humming, chanting, singing, shouting, and the like. In some embodiments, a hand gesture contention may include two entities performing a second gesture. A second gesture may include a movement of a hand having an orientation. A movement of a hand having an orientation may include, but is not limited to, a vertical, horizontal, diagonal, frontal, backwards, and/or other movement. In some embodiments, a contention may be resolved as a function of two entity hand movements. In some embodiments, a matching hand movement between two entities may deem a contending entity a successor. In some embodiments, a differing hand movement between two entities may deem an aggressor entity as a successor. In some embodiments, a hand gesture contention may include two or more cycles to determine a victor. For examples, In some embodiments, a hand gesture contention may include the two player game Cham Cham Cham from Korea. In some embodiments, a hand gesture contention may include the two player game rock, paper, scissors.

Still referring to FIG. 3, in some embodiments, a photographic identification contention may include a book that may include a plurality of pictures pertaining to an area of knowledge. A photographic identification contention may include two or more entities. In some embodiments, a photographic identification contention may include two or more entities acquiring a book of photographic images of an area of knowledge. In some embodiments, a photographic identification contention may be resolved as a function of an identification of elements by an entity in one or more photographic images. In some embodiments, a page of a photographic book may be randomly opened for each entity. An entity may be challenged with locating as many elements as possible in a photographic image of a photographic book. In some embodiments, an element may include, but is not limited to, an individual, an object, a color, a shape, and the like. In some embodiments, an element may include a celebrity, musician, actor, and the like. In some embodiments, a photographic identification contention may pair a score of elements located to an entity. An entity having a higher score may be deemed a victor of a photographic identification contention. In some embodiments, a scoring in a photographic identification contention may include disqualifiers. A "disqualifier" as used in this disclosure is an action and/or attribute that eliminates an entity from a contention. Disqualifiers may include but are not limited to, duplicate elements, obscure elements, and the like. As a non-limiting example, an entity may find two images of the same musician in a photograph. The two images may count as only one image for scoring purposes in a photographic identification contention. In another non-limiting example, an entity may locate a musician in a photograph with a face hidden by a galaxy image. This may not count as locating an element and may not be scored. In some embodiments, a book of photographic images of a photographic identification contention may be referred to as a "Book of Memories". In some embodiments, a "Book of Memories" may include photographic images of a boy band.

Still referring to FIG. 3, a random knowledge contention may include a contention between two or more entities. A random knowledge contention may prompt an entity with a question pertaining to a specific area of knowledge. In some embodiments, a random knowledge contention may be resolved by correctly answering a question. In some embodiments, a random knowledge contention may include prerequisites for a victor to be declared. In some embodiments, prerequisites may include, but are not limited to, an entity shouting their own name. In some embodiments, a neutral entity not engaging in a random knowledge contention may determine which entity shouted their name first. Whichever entity is determined to have shouted their name first may answer a question prompted by a random knowledge contention. A random knowledge contention may be resolved when an entity answers a question correctly. In some embodiments, a first entity may answer a question incorrectly. A subsequent entity may answer a question until the question is answered correctly.

Still referring to FIG. 3, a recollection contention may include two or more entities. In some embodiments, a recollection contention may include utilization of a photographic book. A photographic book may include a plurality of photographs pertaining to an area of knowledge. In some embodiments, a plurality of photographs may include images from an episode of a tv show. In some embodiments, an entity in a recollection contention may choose a moment in time of a knowledge area as a function of a photographic image of a photographic book. A second entity in a recollection contention may not be shown a photographic image of a photographic book. In some embodiments, an entity choosing a moment in time may be challenged with remembering a page number of a photograph in a photographic book. An entity choosing a moment in time may describe a moment in time of a knowledge area to an entity not shown a photographic image. In some embodiments, a description of a moment in time of a knowledge area may not be related to an image of a photographic book. An entity not shown an image may be tasked with locating an image in a photographic book relating to a moment in time of a knowledge area chosen by another entity. In some embodiments, an entity that may try to locate an image relating to a moment in time may have a time limit. In some embodiments, a time limit may include, but is not limited to, 10 seconds, 15, seconds, 20 seconds, and the like. In some embodiments, a time limit may be triggered at an opening of a photographic book by an entity searching for a moment in time of a knowledge area. A recollection contention may be resolved at a locating of a moment in time of a knowledge area by an entity within a set time limit.

Still referring to FIG. 3, in some embodiments, modular expertise database 316 may include a category contention. A category contention may include two or more entities. In some embodiments, a category contention may include a first entity selecting a category. A first entity may be tasked with announcing words pertaining to the selected category. In some embodiments, a second entity may be tasked with announcing a word starting with a last letter of a word said by a first entity. A first and second entity may communicate words back and forth until an entity fails to comply. In some embodiments, a time limit for response may be set. A time limit may include, but is not limited to, 5 seconds, 10 seconds, and the like. As a non-limiting example, a first entity may pick a category of food. A first entity may say the word "Apple". A second entity may say "Eggs", a first entity may say "Sandwich", a second entity may say "Hamburger" and so on. A victor may be determined by a process of elimination of other entities that may fail to respond correctly and/or in time.

Still referring to FIG. 3, in some embodiments, entity intercommunication device 116 may include random number generator 324. A "random number generator" as used in this disclosure is any component configured to output a number at random. In some embodiments, random number generator 324 may include, but is not limited to, a die, a coin, a spinning wheel, a computing device, and the like. Entity intercommunication device 116 may combine entity input 308 with an output of random number generator 324 to produce selected expertise assessment module 328. Selected expertise assessment module 328 may include any expertise assessment system described above.

Figure 4:
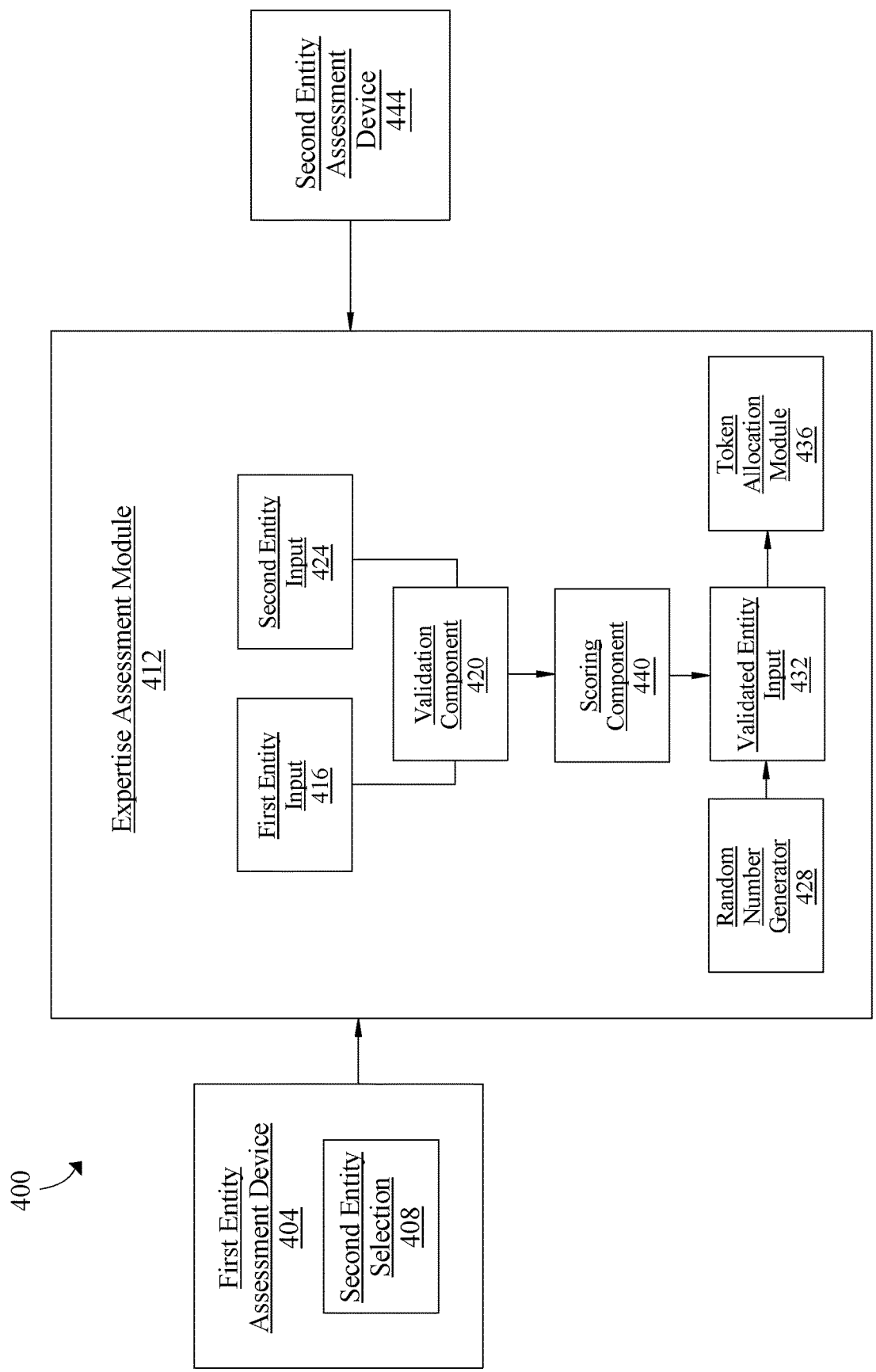
FIG. 4 is a block diagram of an expertise assessment module.

Referring now to FIG. 4, system 400 for modular expertise assessment is shown. In some embodiments, system 400 may include a modular expertise assessment function. A modular expertise assessment function may include one or more sub-functions of an expertise assessment system. System 400 may include first entity assessment device 404. First entity assessment device 404 may be as described earlier in this disclosure. In some embodiments, first entity assessment device 404 may include second entity selection 408. Second entity selection 408 may include a selection of a contending second entity. In some embodiments, expertise assessment module 412 may be configured to receive first entity input 416 from first entity assessment device 404. First entity input 416 may be as described earlier in this disclosure. In some embodiments, expertise assessment module 412 may be configured to receive second entity input 424 from second entity assessment device 444. Second entity assessment device 444 may be as described above. Expertise assessment module 412 may include validation component 420. Validation component 420 may be configured to verify first entity input 416 and/or second entity input 424. In some embodiments, validation component 420 may be as described earlier in this disclosure. Validation component 420 may be configured to communicate with scoring component 440. Scoring component 440 may be as described earlier in this disclosure.

Still referring to FIG. 4, in some embodiments, scoring component 440 may be configured to generate validated entity input 432. A "validated entity input" as used in this disclosure is any verified and/or scored input from an entity. Validated entity input 432 may include a verified input from an entity, such as, but not limited to, a correct physical input, a correct verbal input, a correct written input, and the like. In some embodiments, validated entity input 432 may include a score pairing received by scoring component 440. Validated entity input 432 may include a score such as, but not limited to, a positive numerical value, a negative numerical value, and/or a value of zero. A score may be used by token allocation module 436 to allocate tokens to an entity. Token allocation module 436 may allocate tokens to an entity with a positive score paired to a validated entity input 432. Token allocation module 436 may withdraw tokens from an entity with a negative score paired to a validated entity input 432. Token allocation module 436 may not allocate any tokens of an entity with a score of zero paired to a validated entity input 432. In some embodiments, random number generator 428 may be configured to randomly increase or decrease a score paired to validated entity input 432. In some embodiments, random number generator 428 may output a numerical value. A numerical value generated from random number generator 428 may determine a magnitude change of validated entity input 432. In some embodiments, random number generator 428 may be configured to act as a magnitude randomizer. A "magnitude randomizer" as used in this disclosure is any device that changes a magnitude of a value at random. In a non-limiting example, random number generator 428 may output a numerical value of 4. Random number generator 428 may multiply a score of validated entity input 432 by a factor of 4. In some embodiments, expertise assessment module 412 may be configured to generate token allocation 436 as a function of validated entity input 432. In some embodiments, token allocation module 436 may be configured to transfer one or more tokens to one or more entities. A "token" as used in this disclosure is an object associated with a positive numerical value. In some embodiments, a token may include a physical form. A token may include a dimension such as, but not limited to, a height, a width, a thickness, a length, a circumference, a diameter, a radius, and the like. A token may include a shape. A shape of a token may include, but is not limited to, circular, square, rectangular, and the like. In some embodiments, a shape of a token may correspond to a specific numerical value. In a non-limiting example, a token may have a diameter of about 1 cm to about 4 cm. This token may correspond to a numerical value of 5. In another non-limiting example, a token may have a diameter of about 5 cm to about 10 cm. This token may correspond to a numerical value of 20. Token allocation module 436 may be configured to transfer one or more tokens from a first entity to a second entity. Token allocation 436 may be configured to transfer one or more tokens from a second entity to a first entity. In some embodiments, an amount of tokens that may be transferred may be determined by random number generator 428. In a non-limiting example, random number generator 428 may output a number of 2. Token allocation 436 may transfer two tokens from a first entity to a second entity or vice versa.

Figure 5:
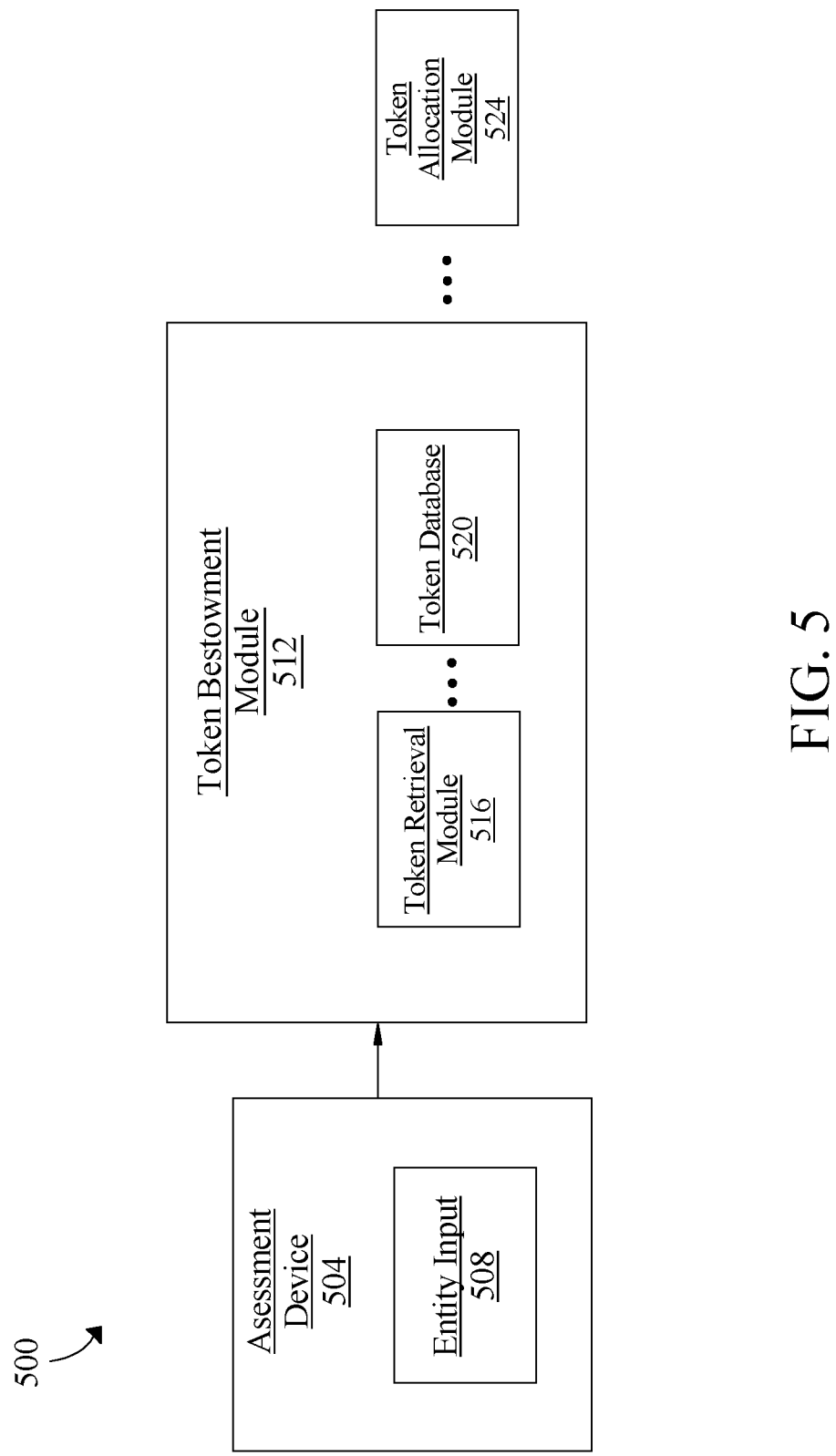
FIG. 5 is a block diagram of a token bestowment system.

Referring now to FIG. 5, system 500 for token bestowment is presented. System 500 may include token bestowment module 512. Token bestowment module 512 may be configured to transfer tokens to and/or from one or more entities. In some embodiments, token bestowment module 512 may be configured to receive entity input 508 from assessment device 504. Assessment device 504 and entity input 508 may be as described above. In some embodiments, token bestowment module 512 may be include token retrieval module 516. Token retrieval module 516 may be configured to determine a category of entity input 508. In some embodiments, a category of entity input 508 may include, but is not limited to, donation, acquisition, and the like.

Still referring to FIG. 5, system 500 may include token allocation module 524. Token allocation module 524 may include a withdrawal and/or deposit of one or more tokens of one or more entities. In some embodiments, token allocation module 524 may be configured to reallocate tokens to and/or from one or more entities as a function of token retrieval module 516. Token retrieval module 516 may be configured to detect a deposit category of entity input 508. Token allocation module 524 may include a reception of one or more tokens deposited from one or more entities. In some embodiments, deposited tokens may be stored in token database 520. In some embodiments, token retrieval module 516 may be configured to detect that entity input 508 may be in a category of withdrawal. In some embodiments, token allocation module 524 may be configured to transfer one or more tokens from token database 520 to an entity as a function of token retrieval module 516.

Figure 6:
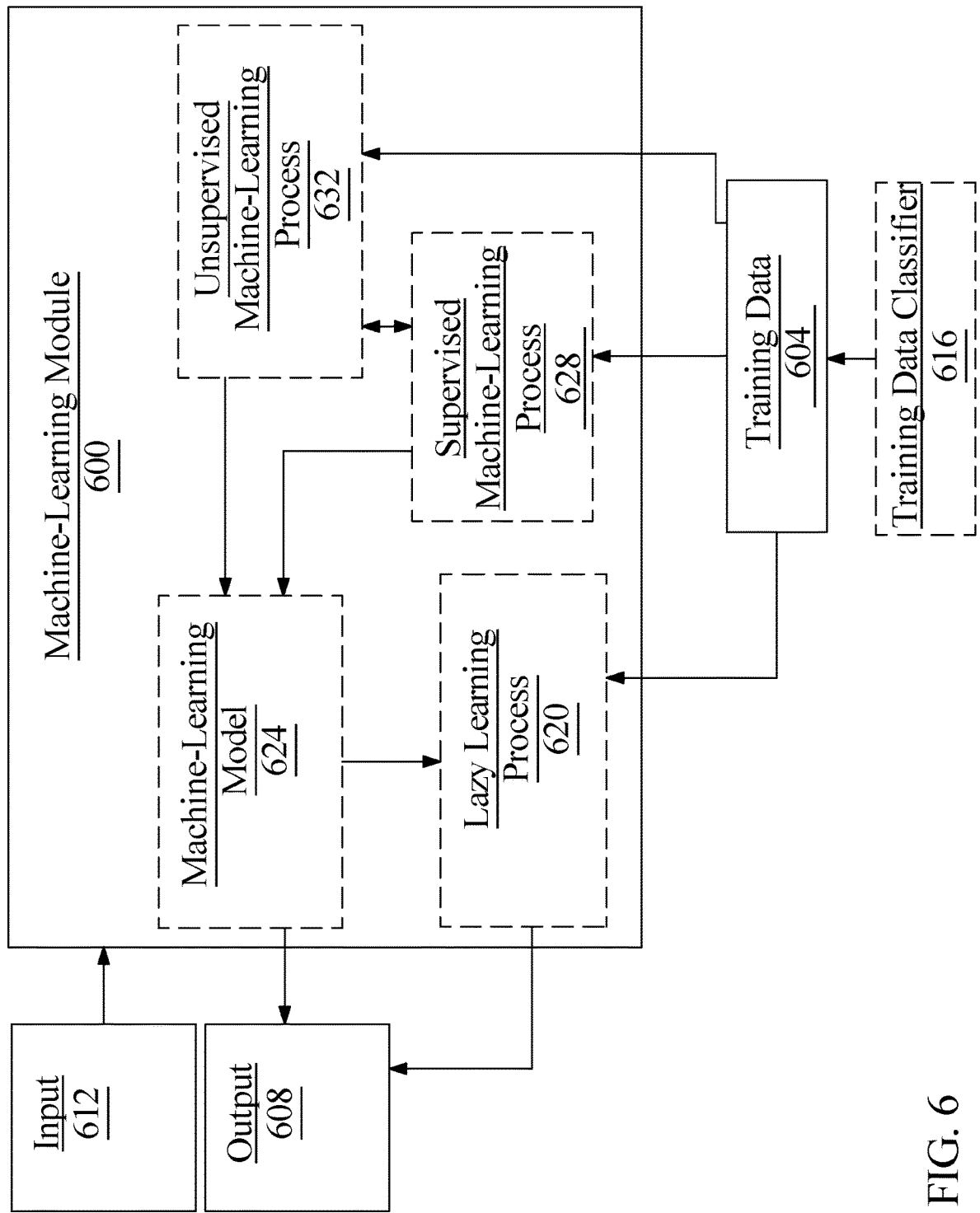
FIG. 6 is a block diagram of a machine learning module.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example inputs may include entity assessment functions as described above, and outputs may include a predicted entity input.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to types of entity inputs, accuracy of entity inputs, and the like. As a non-limiting example, training data classifier 616 may classify elements of training data to assessment function categories, entity expertise skill level, and the like.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include entity inputs as described above as inputs, predicted entity inputs as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Referring now to FIG. 7, a method 700 of manufacturing an entity expertise assessment device is presented. Manufacturing, as described herein, may be performed according to any manufacturing process or combination of manufacturing processes. Manufacturing process may include an additive manufacturing process. In an embodiment, an additive manufacturing process is a process in which material is added incrementally to a body of material in a series of two or more successive steps. A material may be added in the form of a stack of incremental layers; each layer may represent a cross-section of an object to be formed upon completion of an additive manufacturing process. Each cross-section may, as a non-limiting example be modeled on a computing device as a cross-section of graphical representation of the object to be formed; for instance, a computer aided design (CAD) tool may be used to receive or generate a three-dimensional model of an object to be formed, and a computerized process, such as a "slicer" or similar process, may derive from that model a series of cross-sectional layers that, when deposited during an additive manufacturing process, together will form the object. Steps performed by an additive manufacturing system to deposit each layer may be guided by a computer aided manufacturing (CAM) tool. Persons skilled in the art will be aware of many alternative tools and/or modeling processes that may be used to prepare a design for additive manufacture, including without limitation the production of stereolithography (STL) files and the like. In an embodiment, a series of layers are deposited in a substantially radial form, for instance by adding a succession of coatings to the workpiece. Similarly, a material may be added in volumetric increments other than layers, such as by depositing physical voxels in rectilinear form or other forms. Additive manufacturing, as used in this disclosure, may include manufacturing done at an atomic or nano level. Additive manufacturing may also include manufacturing bodies of material that are produced using hybrids of other types of manufacturing processes; for instance, additive manufacturing may be used to join together two portions of a body of material, where each portion has been manufactured using a distinct manufacturing technique. A non-limiting example may be a forged body of material. an example of a forged body of material may have welded material deposited upon it, which then comprises an additive manufactured body of material.

Still referring to FIG. 7, deposition of material in an additive manufacturing process may be accomplished by any suitable means, including without limitation any "three-dimensional printing" process. Deposition may be accomplished by stereolithography, in which successive layers of polymer material are deposited and then caused to bind with previous layers using a curing process such as curing using ultraviolet light, for example. Additive manufacturing processes may include fused deposition modeling processes, in which a polymer material is deposited in a molten or otherwise fluid form in successive layers, each of which is cured by natural cooling or other means. Additive manufacturing processes may include processes that deposit successive layers of powder and binder; the powder may include polymer or ceramic powder, and the binder may cause the powder to adhere, fuse, or otherwise join into a layer of material making up the body of material or product. Likewise, additive manufacturing may be accomplished by immersion in a solution that deposits layers of material on a body of material, by depositing and sintering materials having melting points such as metals, such as selective laser sintering, by applying fluid or paste-like materials in strips or sheets and then curing that material either by cooling, ultraviolet curing, and the like, any combination of the above methods, or any additional methods that involve depositing successive layers or other increments of material. Methods of additive manufacturing may include without limitation vat polymerization, material jetting, binder jetting, material extrusion, fuse deposition modeling, powder bed fusion, sheet lamination, and directed energy deposition. Methods of additive manufacturing may include adding material in increments of individual atoms, molecules, or other particles. An additive manufacturing process may use a single method of additive manufacturing, or combine two or more methods. Companies producing additive manufacturing equipment include 3D Systems, Stratasys, formLabs, Carbon3D, Solidscape, voxeljet, ExOne, envisiontec, SLM Solutions, Arcam, EOS, Concept Laser, Renishaw, XJET, HP, Desktop Metal, Trumpf, Mcor, Optomec, Sciaky, and MarkForged amongst others.

Still referring to FIG. 7, examples of additively manufactured bodies of material include, but are not limited to, plates, slabs, blooms, billets, boards, blocks, among many other shapes, including curvilinear and multisided shapes, and any combination thereof, as set forth in further detail below. As for material(s) composing an additively manufactured body of material, the material(s) may be any suitable material(s), such as metal (solid, sintered, etc.), polymer (solid, foamed, etc.), composite, and multilayer material, or any combination of such materials, among others. Additively manufactured bodies of material may include shapes, such as organic shapes, that have been scanned, for instance and without limitation using LIDAR or similar scanning techniques; scanned shapes may be comprised of primitive shapes, which may be mapped and then additively manufactured. Fundamentally, there is no limitation on the composition of an additively manufactured body of material.

Still referring to FIG. 7, manufacturing methods may include one or more subtractive processes. As used herein, a subtractive manufacturing process is a process that is performed by removal of material from a workpiece. A subtractive manufacturing process may be any suitable subtractive manufacturing process, such as, but not limited to, rotary-tool milling, electronic discharge machining, ablation, etching, erosion, cutting, and cleaving, among others. Fundamentally, there is no limitation on the type of subtractive manufacturing process(es) that may be used. In an example, differing subtractive manufacturing processes may be used before at different stages or to perform different steps of the subtractive manufacturing process as described below.

Still referring to FIG. 7, at step 705, method 700 includes generating a search request. Generating a search request may include generating a web crawler function. A web crawler function may be generated by a computing device. In some embodiments, a web crawler function may be configured to generate a web query. A web query may include search criteria. Search criteria may include areas of knowledge such as, but not limited to, sports history, English, science, media, celebrities, and the like. A web crawler function may be configured to search for and/or detect one or more data patterns. A "data pattern" as used in this disclosure is any repeating forms of information. A data pattern may include, but is not limited to, keywords, phrases, and the like. In some embodiments, a web crawler function may be configured to determine a relevancy of a data pattern. A relevancy may be determined by a relevancy score. A relevancy score may be automatically generated by a computing device, received from a machine learning model, and/or received from a user input. In some embodiments, a relevancy score may include a range of numerical values that may correspond to a relevancy strength of data received from a web crawler function. As a non-limiting example, a web crawler function may search the Internet for a keyword such as "KPOP". The web crawler function may return data results of specific KPOP bands, KPOP history, top KPOP songs, and the like. A relevancy score of 8 from a scale of 1-10, with 10 being the most relevant, may be assigned to the specific KPOP bands results. A relevancy score of 4 may be assigned to the KPOP history results. A relevancy score of 7 may be assigned to the top KPOP songs results. In some embodiments, a web crawler function may be configured to store data results in a database. A web crawler function may categorize data results into different categorizes. In some embodiments, a web crawler function may utilize a classifier machine learning model to classify data results. Classification may include categorizing one or more data results into one or more data categories. Categories may include, but are not limited to, celebrities, musicians, artists, actors, movies, tv shows, science facts, history facts, math facts, and the like. Classification of data results may include sub-categories, such as, but not limited to, rock band artists, action movie actors, World War II history, electromagnetism trivia, car model trivia, and the like. In some embodiments, a web crawler function may be configured to index a plurality of data by a media type. A "media type" as used in this disclosure is a category of data. A media type may include, but is not limited to, TV shows, movies, songs, books, pictures, and the like. This step may be implemented, without limitation, as described above in FIGS. 1-6.

Still referring to FIG. 7, at step 710, method 700 includes receiving expertise assessment data. Expertise assessment data may be received from a search request, such as a web query. Expertise assessment data may be indexed as described above. In some embodiments, expertise assessment data may include data pertaining to an area of knowledge that an entity may be assessed on. In some embodiments, expertise assessment data may be sorted by a metric such as, but not limited to, a freshness, age, or other metric. In some embodiments, expertise assessment data received may be used to generate one or more entity expertise assessment functions. Generating one or more entity expertise assessment functions ay include generating trivia questions from data received from a search request. A computing device may determine a trivia type, question, and the like as a function of the classification of data results as described above. In some embodiments, a computing device may be configured to filter data results into question categories. A computing device may filter data results based on a relevancy score, category, sub-category, and the like. A computing device may generate trivia questions using sorted and/or filtered data of data results of a search request. In some embodiments, a computing device may utilize a machine learning model that may be configured to input data results and output a most relevant data result. In some embodiments, a computing device may be configured to retrieve one or more search results from a database. A computing device may generate a search index that may link one or more search results to one or more categories, such as, but not limited to, expertise type, relevancy score, media category, freshness, and the like. This step may be implement as described above in FIGS. 1-6.

Still referring to FIG. 7, at step 715, method 700 includes determining an expertise level of expertise assessment data. An expertise level may be determined by a computing device. In some embodiments, a computing device may use a logic comparison program, such as, but not limited to, a fuzzy logic model to determine an expertise level. An expertise level may include, but is not limited to, amateur, average, knowledgeable, superior, and the like; each such expertise level may be represented as a value for a linguistic variable representing expertise level, or in other words a fuzzy set as described above that corresponds to a degree of expertise and/or difficulty as calculated using any statistical, machine-learning, or other method that may occur to a person skilled in the art upon reviewing the entirety of this disclosure. In other words, a given element of expertise assessment data may have a first non-zero value for membership in a first linguistic variable value such as "average," and a second non-zero value for membership in a second linguistic variable value such as "knowledgeable." In some embodiments, determining an expertise level may include using a linear regression model. A linear regression model may include a machine learning model. A linear regression model may be configured to map data of entity expertise assessment functions, such as trivia questions, to one or more expertise levels. A linear regression model may be trained using a web crawler search result, trivia question identification, entity scores of trivia questions and the like correlated to expertise levels. A linear regression model may map statistics such as, but not limited to, frequency of appearance in entity engagements, and the like, to entity expertise levels. In some embodiments, determining an expertise level of expertise assessment data may include using an expertise level classification model. An expertise level classification model may be configured to input collected data and cluster data to a centroid based on, but not limited to, frequency of appearance, linguistic indicators of difficulty, and the like. Centroids may include scores assigned to them such that entity expertise assessment functions may each be assigned a score. In some embodiments, an expertise level classification model may include a K-means clustering model. In some embodiments, an expertise level classification model may include a particle swarm optimization model. In some embodiments, determining an expertise level of expertise assessment data may include using a fuzzy inference engine. A fuzzy inference engine may be configured to map one or more entity expertise data elements using fuzzy logic. In some embodiments, a plurality of entity assessment devices may be arranged by a logic comparison program into expertise arrangements. An "expertise arrangement" as used in this disclosure is any grouping of objects and/or data based on skill level and/or output score. This step may be implemented as described above in FIGS. 1-6. Membership function coefficients and/or constants as described above may be tuned according to classification and/or clustering algorithms. For instance, and without limitation, a clustering algorithm may determine a Gaussian or other distribution of questions about a centroid corresponding to a given difficulty level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 7, inference engine may be implemented according to input and/or output membership functions and/or linguistic variables. For instance, a first linguistic variable may represent a first measurable value pertaining to a trivia question, such as a degree of difficulty of an element of trivia, while a second membership function may indicate a degree of popularity of a subject thereof, or another measurable value pertaining to a trivia question. Continuing the example, an output linguistic variable may represent, without limitation, score value and/or expertise level. An inference engine may combine rules, such as: "if the difficulty level is 'hard' and the popularity level is 'high', the question score is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Further referring to FIG. 7, questions to be used may be selected by user selection, and/or by selection of a distribution of output scores and/or expertise levels, such as 30% hard/expert, 40% moderate average, and 30% easy/beginner levels or the like. Each difficulty/score level set may be selected using an additional function such as popularity as described above.

Still referring to FIG. 7, at step 720, method 700 includes applying expertise assessment data to at least an entity assessment device. In some embodiments, expertise assessment data may be applied as a function of an expertise level associated with a datum of expertise assessment data. Applying expertise assessment data to at least an entity assessment device may include printing textual information onto an entity assessment device. In some embodiments, expertise assessment data may be applied to at least an entity assessment device using a 3-D printer. In some embodiments, applying expertise assessment data may include applying a form of ink to an ink carrier. An "ink carrier" as used in this disclosure is any material capable of retaining ink. In some embodiments, applying expertise assessment data to at least an entity assessment device may include applying pictorial data, auditorial data, and the like to an entity assessment device. In some embodiments, an entity assessment device may include, but is not limited to, a trivia card, photobook, and the like. In some embodiments, applying expertise assessment data to at least an entity assessment device may include printing one or more trivia questions, scores, and/or images onto trivia cards This step may be implemented as described above in FIGS. 1-6.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for assessing entity expertise, comprising: an entity intercommunication device including a computing device configured to:
   receive entity input from a plurality of assessment devices, wherein the plurality of assessment devices includes expertise assessment data, wherein the expertise assessment data includes knowledge of celebrities;
   validate the entity input as a function of an exterior dataset;
   score the entity input as a function of the validation of the entity input;
   determine an expertise level of the expertise assessment data using a fuzzy logic comparison, wherein the fuzzy logic comparison compares a first fuzzy set representing entity scores to a second fuzzy set representing entity expertise skill level;
   generate a web search request for expertise assessment data based on a search criterion, wherein the search criterion includes an area of knowledge of celebrities;
   classify entity expertise data from results of the web search request to at least a celebrity category as a function of a classifier machine learning model, wherein the classifier machine learning model is trained with training data correlating entity expertise data to data categories of entity expertise data to, wherein the classifier machine learning model is configured to input entity expertise data and output data categories of the entity expertise data of; and
   apply the classified entity expertise assessment data to at least an assessment device of the plurality of assessment devices through an additive manufacturing process of a computer aided manufacturing (CAM) tool, wherein the additive manufacturing process comprises a 3-D printing process.

2. The system of claim 1, wherein the at least an assessment device comprises a question card.

3. The system of claim 1, wherein the computing device is further configured to generate a web crawler function to search for expertise assessment data.

4. The system of claim 1, wherein the computing device is further configured to generate a web search index from the data results of the web search request.

5. The system of claim 1, wherein the computing device is further configured to sort data results of the web search request based on a freshness of the data results.

6. The system of claim 1 wherein the computing device is further configured to print textual information onto the at least an assessment device.

7. The system of claim 1, wherein the computing device is further configured to determine a ranking of an entity of a plurality of entities as a function of the scoring of the entity input.

8. The system of claim 1, wherein the scoring of the entity input includes a degree of correctness.

9. The system of claim 1, wherein the entity intercommunication device further comprises a token bestowment system generated by the computing device, wherein the token bestowment system is configured to:

receive at least a token of an entity;

store the at least a token of an entity; and reallocate the at least a token to at least another entity as a function of the entity conveyance system.

10. The system of claim 1, wherein the computing device is further configured to allocate tokens to at least an entity as a function of the scoring of the entity input.

11. The system of claim 1, wherein the includes a plurality of tokens, wherein each token of the plurality of tokens includes a dimension corresponding to a score value.

12. The system of claim 1, wherein the computing device is further configured to sort results from the web search request based on a relevancy score.

13. The system of claim 1, wherein applying the expertise assessment data includes printing scores onto the at least an entity assessment device.

14. The system of claim 1, wherein applying expertise assessment data to at least an entity assessment device includes applying pictorial data received from the web search request to a photobook.

* * * * *